US 12,230,750 B2

(12) United States Patent
Cho et al.

(10) Patent No.: US 12,230,750 B2
(45) Date of Patent: Feb. 18, 2025

(54) BUTTON-TYPE SECONDARY BATTERY

(71) Applicant: LG ENERGY SOLUTION, LTD., Seoul (KR)

(72) Inventors: Min Su Cho, Daejeon (KR); Joo Hwan Sung, Daejeon (KR); Yong Gon Lee, Daejeon (KR); Je Jun Lee, Daejeon (KR); Jae Won Lim, Daejeon (KR); Geon Woo Min, Daejeon (KR); Min Gyu Kim, Daejeon (KR); Sang Hak Chae, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 360 days.

(21) Appl. No.: 17/796,621

(22) PCT Filed: Sep. 8, 2021

(86) PCT No.: PCT/KR2021/012207
§ 371 (c)(1),
(2) Date: Jul. 29, 2022

(87) PCT Pub. No.: WO2022/059997
PCT Pub. Date: Mar. 24, 2022

(65) Prior Publication Data
US 2023/0062173 A1    Mar. 2, 2023

(30) Foreign Application Priority Data

Sep. 15, 2020  (KR) .................. 10-2020-0118627
Aug. 25, 2021  (KR) .................. 10-2021-0112633

(51) Int. Cl.
*H01M 10/00*   (2006.01)
*H01M 10/04*   (2006.01)
(Continued)

(52) U.S. Cl.
CPC ..... *H01M 10/0427* (2013.01); *H01M 50/109* (2021.01); *H01M 50/186* (2021.01)

(58) Field of Classification Search
CPC ... H01M 10/04; H01M 50/109; H01M 50/186
See application file for complete search history.

(56) References Cited

U.S. PATENT DOCUMENTS

2008/0226981 A1    9/2008  Yoon
2011/0236753 A1    9/2011  Kuriki et al.
(Continued)

FOREIGN PATENT DOCUMENTS

CN    109065823 A    12/2018
CN    111224054 A     6/2020
(Continued)

OTHER PUBLICATIONS

Chang et al., Rechargeable Button Battery, Aug. 2020, See the Abstract. (Year: 2020).*

(Continued)

*Primary Examiner* — Anca Eoff
*Assistant Examiner* — Monique M Wills
(74) *Attorney, Agent, or Firm* — MORGAN, LEWIS & BOCKIUS LLP

(57) ABSTRACT

A button-type secondary battery according to the present disclosure includes: an electrode assembly; a lower can configured to accommodate the electrode assembly; an upper can coupled to an opening of the lower can; a gasket configured to insulate a coupling portion between the lower can and the upper can; and a center part provided at a core portion of the electrode assembly, wherein the center part includes: a center pin inserted into the core portion of the electrode assembly; and an upper plate provided with an upper cover surface provided on an upper end of the center pin to protect an upper portion of the electrode assembly, (Continued)

wherein an edge of the upper cover surface is provided to be supported on an inner wall of the lower can.

13 Claims, 7 Drawing Sheets

(51) Int. Cl.
*H01M 50/109* (2021.01)
*H01M 50/186* (2021.01)

(56) References Cited

U.S. PATENT DOCUMENTS

| | | |
|---|---|---|
| 2012/0015224 A1 | 1/2012 | Pytlik et al. |
| 2012/0100406 A1 | 4/2012 | Gaugler |
| 2015/0372339 A1 | 12/2015 | Pytlik et al. |
| 2017/0025703 A1 | 1/2017 | Pytlik et al. |
| 2017/0187008 A1 | 6/2017 | Gaugler |
| 2017/0365874 A1 | 12/2017 | Pytlik et al. |
| 2018/0013101 A1 | 1/2018 | Gaugler |
| 2018/0097215 A1 | 4/2018 | Cho et al. |
| 2020/0083497 A1 | 3/2020 | Sabrowsky et al. |
| 2020/0099018 A1 | 3/2020 | Gaugler |
| 2020/0185755 A1 | 6/2020 | Pytlik et al. |
| 2020/0194736 A1 | 6/2020 | Gaugler |
| 2020/0194820 A1 | 6/2020 | Pytlik et al. |
| 2020/0212373 A1 | 7/2020 | Gaugler |
| 2020/0212374 A1 | 7/2020 | Gaugler |
| 2020/0212473 A1 | 7/2020 | Pytlik et al. |
| 2020/0212474 A1 | 7/2020 | Pytlik et al. |
| 2021/0175535 A1 | 6/2021 | Pytlik et al. |
| 2021/0184298 A1 | 6/2021 | Gaugler |
| 2021/0265686 A1 | 8/2021 | Gaugler |
| 2021/0399369 A1 | 12/2021 | Gaugler |
| 2021/0399370 A1 | 12/2021 | Gaugler |
| 2022/0209279 A1 | 6/2022 | Pytlik et al. |
| 2022/0209337 A1 | 6/2022 | Gaugler |

FOREIGN PATENT DOCUMENTS

| | | | |
|---|---|---|---|
| CN | 111525173 A | * | 8/2020 |
| JP | H10-112304 A | | 4/1998 |
| JP | 2000-011981 A | | 1/2000 |
| JP | 2001229905 A | | 8/2001 |
| JP | 2007-294111 A | | 11/2007 |
| KR | 10-0601541 B1 | | 7/2006 |
| KR | 10-0686850 B1 | | 2/2007 |
| KR | 10-2007-0037882 A | | 4/2007 |
| KR | 10-2007-0071236 A | | 7/2007 |
| KR | 10-2008-0032911 A | | 4/2008 |
| KR | 10-2008-0036256 A | | 4/2008 |
| KR | 10-0824896 B1 | | 4/2008 |
| KR | 10-2008-0084450 A | | 9/2008 |
| KR | 10-2009-0081966 A | | 7/2009 |
| KR | 10-2011-0124269 A | | 11/2011 |
| KR | 10-2012-0036970 A | | 4/2012 |
| KR | 10-2013-0040187 A | | 4/2013 |
| KR | 10-2013-0091532 A | | 8/2013 |
| KR | 10-2017-0047053 A | | 5/2017 |
| KR | 10-2018-0036086 A | | 4/2018 |
| KR | 10-2020-0007560 A | | 1/2020 |

OTHER PUBLICATIONS

Office Action dated Jun. 28, 2024 issued in Chinese Patent Application No. 202180011153.4. Note: KR20070071236A and US2012015224A1 cited therein is already of record.
International Search Report (with partial translation) and Written Opinion dated Dec. 27, 2021, for corresponding International Patent Application No. PCT/KR2021/012207.
Extended European Search Report dated Oct. 18, 2024 issued in European Patent Application No. 21869619.3.

* cited by examiner

BUTTON-TYPE SECONDARY BATTERY

CROSS-REFERENCE TO RELATED APPLICATION

The present application claims the benefit of the priority of Korean Patent Application Nos. 10-2020-0118627, filed on Sep. 15, 2020, and 10-2021-0112633, filed on Aug. 25, 2021, which are hereby incorporated by reference in their entirety.

TECHNICAL FIELD

The present invention relates to a button-type secondary battery, in which a center part provided at a core portion of an electrode assembly is improved to prevent the electrode assembly from being deformed.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like.

The secondary battery comprises a button-type secondary battery having a high energy density, a high output, and a long lifespan. The button-type secondary battery comprises an electrode assembly, a lower can having an accommodation groove accommodating the electrode assembly, an upper can coupled to the lower can to finish the accommodation groove, and a gasket sealing a gap between the lower can and the upper can.

Also, the electrode assembly has a structure in which a first electrode and a second electrode are sequentially stacked with a separator therebetween and wound in the form of a jelly-roll. A first electrode tab connected to the lower can is provided on the first electrode, and a second electrode tab connected to the upper can is provided on the second electrode. As the electrode assembly is wound in the form of the jelly-roll, a hollow is formed in the core portion.

However, the electrode assembly has a problem in that the core portion of the electrode assembly, in which the hollow is formed, is pressed or bent due to an external impact or movement to cause deformation, and thus, a defect rate greatly increases.

DISCLOSURE OF THE INVENTION

Technical Problem

The present invention is invented to solve the above problem and is provided with a center part at a core portion of an electrode assembly, and the center part comprises a center pin inserted into a hollow of the electrode assembly and upper and lower plates, which are provided on upper and lower ends of the center pin, respectively. Due to this feature, an object of the present invention is to provide a button-type secondary battery, in which deformation such as pressing or bending of a core portion of an electrode assembly is prevented from occurring to greatly reduce a defect rate.

Particularly, the present invention is characterized in that edges of upper and lower plates are supported on an inner wall of a lower can. Due to this feature, an object of the present invention is to provide a button-type secondary battery in which a center part is prevented from moving inside a lower can to prevent an electrode assembly wound around the center part from moving.

Technical Solution

A button-type secondary battery according to the present invention comprises: an electrode assembly; a lower can configured to accommodate the electrode assembly; an upper can coupled to an opening of the lower can; a gasket configured to insulate a coupling portion between the lower can and the upper can; and a center part provided at a core portion of the electrode assembly, wherein the center part comprises: a center pin inserted into the core portion of the electrode assembly; and an upper plate provided with an upper cover surface provided on an upper end of the center pin to protect an upper portion of the electrode assembly, wherein an edge of the upper cover surface is provided to be supported on an inner wall of the lower can.

The center pin may have a hollow that is opened vertically, and the upper plate may further comprise an upper coupling surface configured to connect the upper cover surface to the center pin while being coupled to the hollow of the center pin.

The upper plate may further comprise an upper fixing part configured to fix the upper coupling surface coupled to the center pin.

The upper fixing part may be provided as a fixing pin that passes through the center pin to fix the center pin and the upper coupling surface while being coupled to the upper coupling surface.

The button-type secondary battery may further comprise a first electrode tab configured to connect a first electrode disposed on an outer circumferential surface of the electrode assembly to the upper can, wherein the first electrode tab may comprises: a first-a coupling surface connected to the first electrode; and a first-b coupling surface connected to the upper can, wherein a through-hole, into which a connection portion between the first-a coupling surface and the first-b coupling surface is inserted, may be formed in the upper cover surface.

An end of the first-b coupling surface may extend toward the inner wall of the lower can and be supported on the gasket disposed between the lower can and the upper can.

The center part may comprise a lower plate provided with a lower cover surface provided on a lower end of the center pin to protect a lower portion of the electrode assembly, and an edge of the lower cover surface may be provided to be supported on the inner wall of the lower can.

The center pin may have a hollow that is opened vertically, and the lower plate may further comprise a lower coupling surface configured to connect the lower cover surface to the center pin while being coupled to the hollow of the center pin.

The lower plate may further comprise a lower fixing part configured to fix the lower coupling surface coupled to the center pin.

The lower fixing part may be provided as a fixing pin that passes through the center pin to fix the center pin and the lower coupling surface while being coupled to the lower coupling surface.

The button-type secondary battery may further comprise a second electrode tab configured to connect a second electrode disposed on an outer circumferential surface of the electrode assembly to the lower can, wherein the second electrode tab may comprises: a second-a coupling surface connected to the second electrode; and a second-b coupling surface connected to the lower can, wherein a through-hole, into which a connection portion between the second-a coupling surface and the second-b coupling surface is inserted, may be formed in the lower cover surface.

An end of the second-b coupling surface may extend toward the inner wall of the lower can and be supported on the inner wall of the lower can.

The center part may be made of an insulating material.

Advantageous Effects

The button-type secondary battery of the present invention may comprise the electrode assembly, the lower can, the upper can, the gasket, and the center part provided at the core portion of the electrode assembly. The center part may comprise the center pin and the upper and lower plates. Due to such the characteristic, the deformation of the electrode assembly may be prevented from occurring to stably protect the upper and lower portions of the electrode assembly.

MODE FOR CARRYING OUT THE INVENTION

Figure 1:
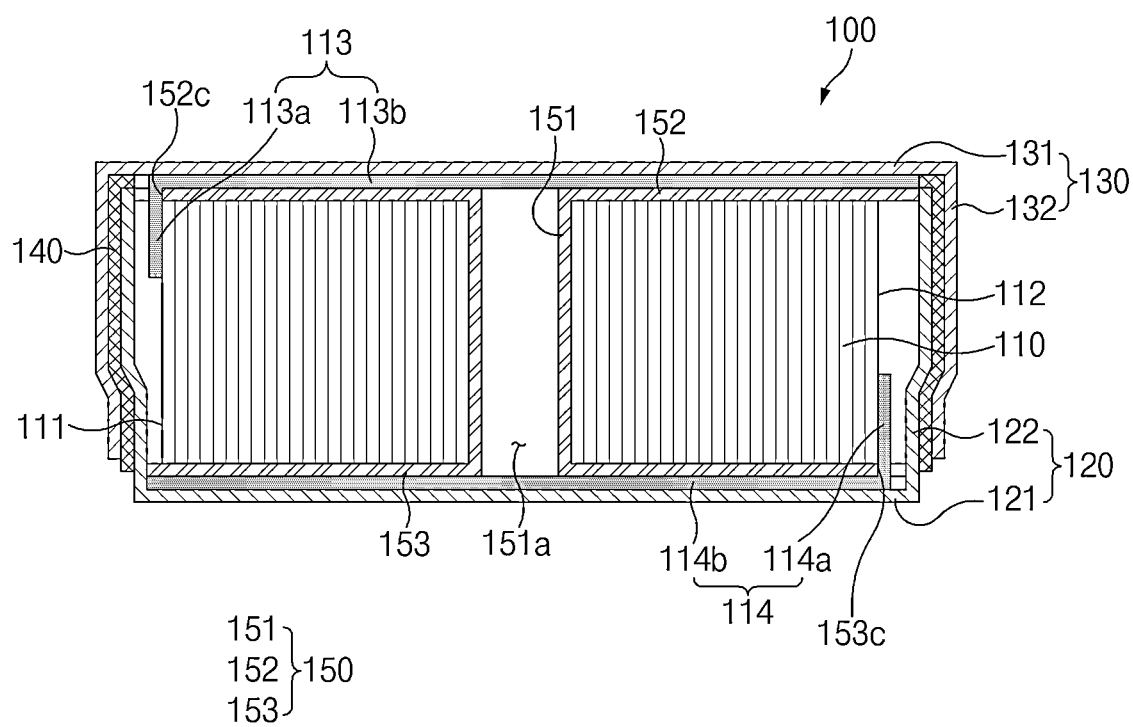
FIG. 1 is a cross-sectional view of a button-type secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Button-Type Secondary Battery According to First Embodiment of the Present Invention]

As shown in FIGS. 1 to 4, a button-type secondary battery 100 according to a first embodiment of the present invention comprises an electrode assembly 110, a lower can 120 accommodating the electrode assembly 110, an upper can 130 is coupled to an opening of the lower can 120, a gasket 140 that insulates a coupling portion between the lower can 120 and the upper can 130, and a center part 150 provided at a core portion of the electrode assembly 110.

Electrode Assembly

The electrode assembly 110 has a structure in which a first electrode 111 and a second electrode 112 are alternately disposed with a separator therebetween and is wound in the shape of a jelly-roll. Here, a distal end of the first electrode 111 and a distal end of the second electrode 112 are disposed on the outermost sides of the electrode assembly 110, respectively. In addition, a first electrode tab 113 is connected to the distal end of the first electrode 111, and a second electrode tab 114 is connected to the distal end of the second electrode 112.

The first electrode tab 113 comprises a first-a coupling surface 113a coupled to the distal end of the first electrode 111 and a first-b coupling surface 113b extending between a top surface and an upper can of the electrode assembly 110 and coupled to the upper can 130.

The second electrode tab 114 comprises a second-a coupling surface 114a coupled to the distal end of the second electrode 112 and a second-b coupling surface 114b extending between a bottom surface and a lower can 120 of the electrode assembly 110 and coupled to the lower can 120.

The first electrode is a positive electrode, and the second electrode is a negative electrode. Of course, the first electrode tab is a positive electrode tab, and the second electrode tab is a negative electrode tab.

Lower Can

The lower can 120 is configured to accommodate the electrode assembly. That is, the lower can 120 comprises a bottom surface 121, on which the electrode assembly 110 is disposed, and a wall surface 122 formed along an edge of the bottom surface 121 to form an accommodation space accommodating the electrode assembly.

Upper Can

The upper can 130 is coupled to the opening of the lower can to finish the accommodation space of the lower can. That is, the upper can 130 comprises a cover surface 131 disposed on the opening of the lower can 120 to finish the accommodation space of the lower can 120 and a coupling surface 132 formed along an edge of the cover surface 131 and coupled to the wall surface 122.

The lower can 120 and the upper can 130, which have the above-described structure, are coupled in a press-fitting manner.

Gasket

The gasket 140 is configured to seal and insulate the lower can and the upper can. That is, the gasket 140 comprises an outer gasket disposed between the wall surface 122 of the lower can 120 and the coupling surface 132 of the upper can 130 and an inner gasket coupled to the outer gasket and disposed between the wall surface and the cover surface.

Here, the button-type secondary battery 100 comprises a center part 150 for allowing the electrode assembly to be wound in the form of a jelly-roll and maintaining an external shape of the electrode assembly.

In the related art, when the manufacturing of the electrode assembly is completed, the center part provided at the core of the electrode assembly is removed. Here, a hollow is formed in the core portion of the electrode assembly from which the center part is removed. However, there is a problem in that the core portion of the electrode assembly from which the center part is removed is easily pressed or bent due to an external impact or movement of the electrode assembly. Particularly, there is a problem in that damage and short-circuit of the electrode assembly occur as the electrode assembly moves inside the lower can.

In order to solve the above problems, in the button-type secondary battery 100 according to the first embodiment of the present invention, the center part provided at the core of the electrode assembly may not be removed and in particular may be improved to prevent deformation an short-circuit of the electrode assembly from occurring.

Hereinafter, the center part provided in the button-type secondary battery 100 according to the first embodiment of the present invention will be described in detail.

Center Part

The center part 150 comprises a center pin 151 provided at the core portion of the electrode assembly 110 to support the core portion of the electrode assembly, an upper plate 152 comprising an upper cover surface 152a provided above the center pin 151 to protect an upper portion of the electrode assembly 110, and a lower plate 153 provided below the center pin 151 to protect a lower portion of the electrode assembly 110.

That is, the center part 150 supports the core portion of the electrode assembly 110 through the center pin 151 to prevent deformation, protect the upper portion of the electrode assembly 110 from the external impact through the upper plate 152, and protect the lower portion of the electrode assembly 110 from the external impact through the lower plate 153.

Particularly, an edge of the upper cover surface 152a of the upper plate 152 is supported on a wall surface 122 that is an inner wall of the lower can 120 so as not to move inside the lower can 120 to prevent noise from being generated by the upper cover surface and prevent an upper end of the electrode assembly, which is provided on the center pin 151, from moving in left and right directions. Particularly, the upper cover surface 152a may reinforce strength of the lower can while being supported on the wall surface of the lower can to greatly prevent the lower can from being deformed.

Figure 2:
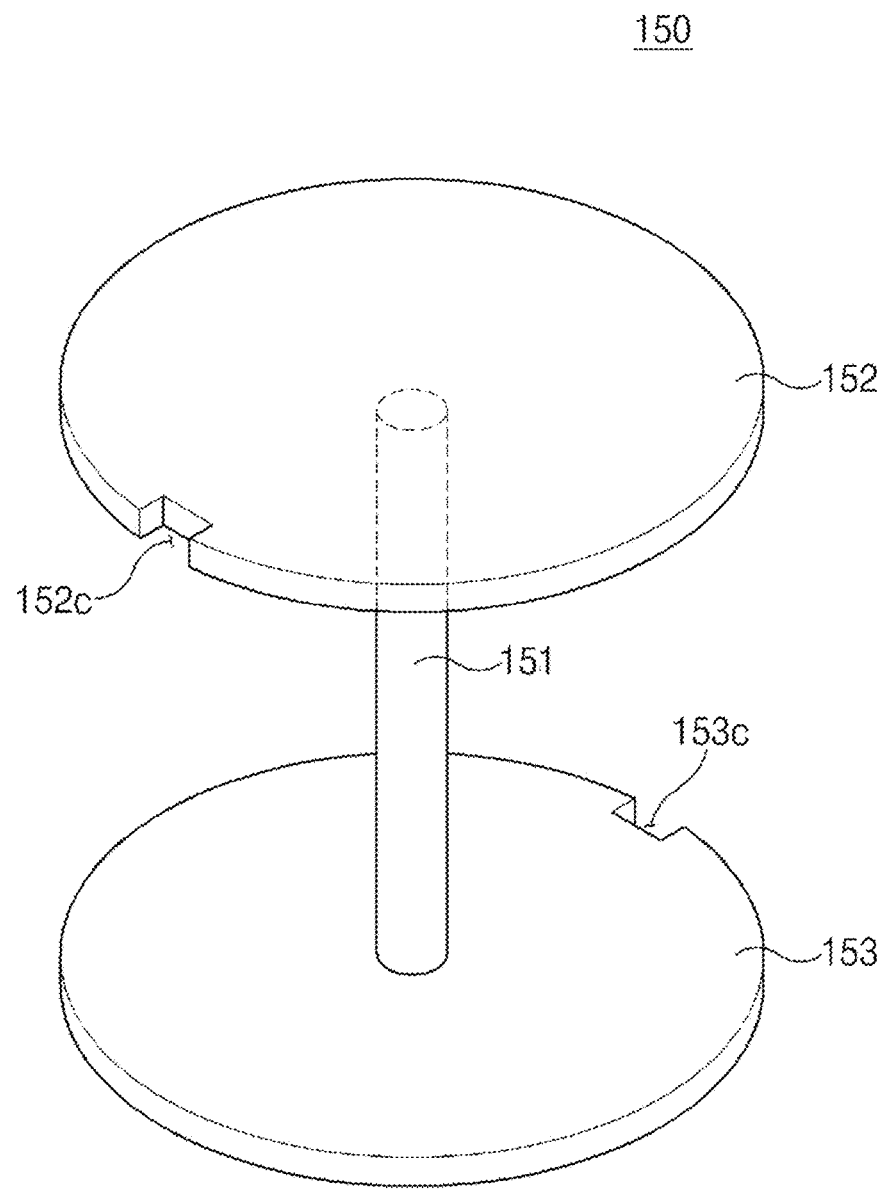
FIG. 2 is a perspective view illustrating a center part of the button-type secondary battery according to the first embodiment of the present invention.
Figure 3:
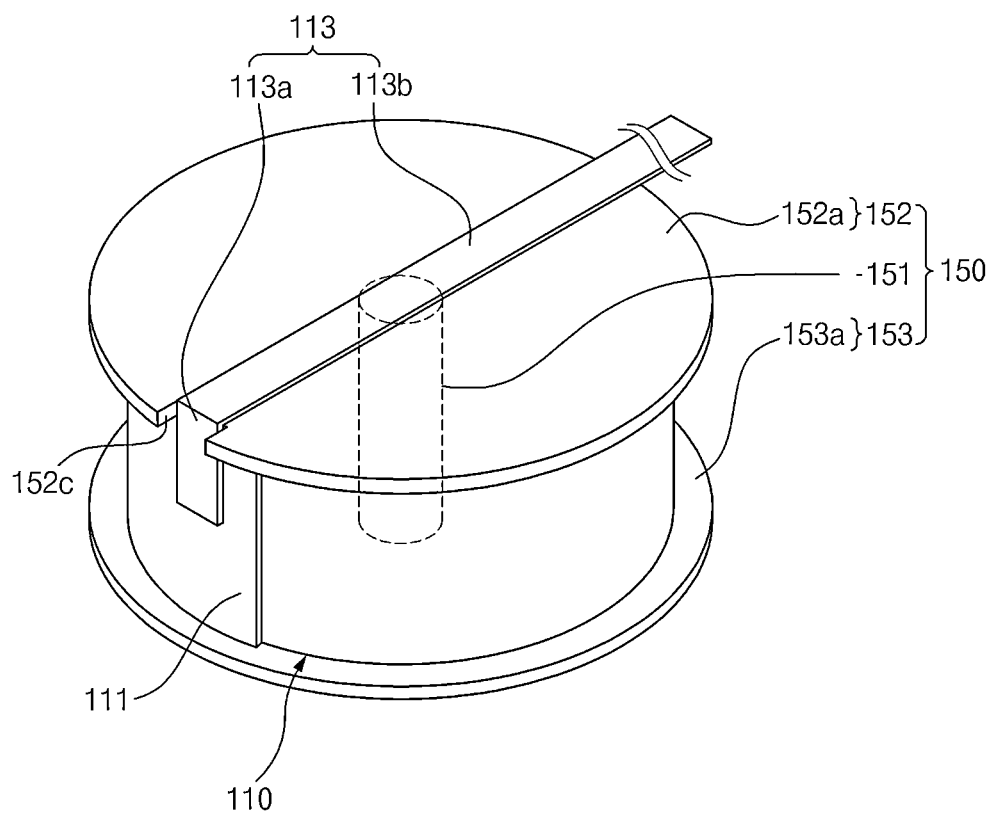
FIG. 3 is a perspective view illustrating a state in which an electrode assembly, the center part, and a first electrode tab of the button-type secondary battery are coupled to each other according to the first embodiment of the present invention.
Figure 4:
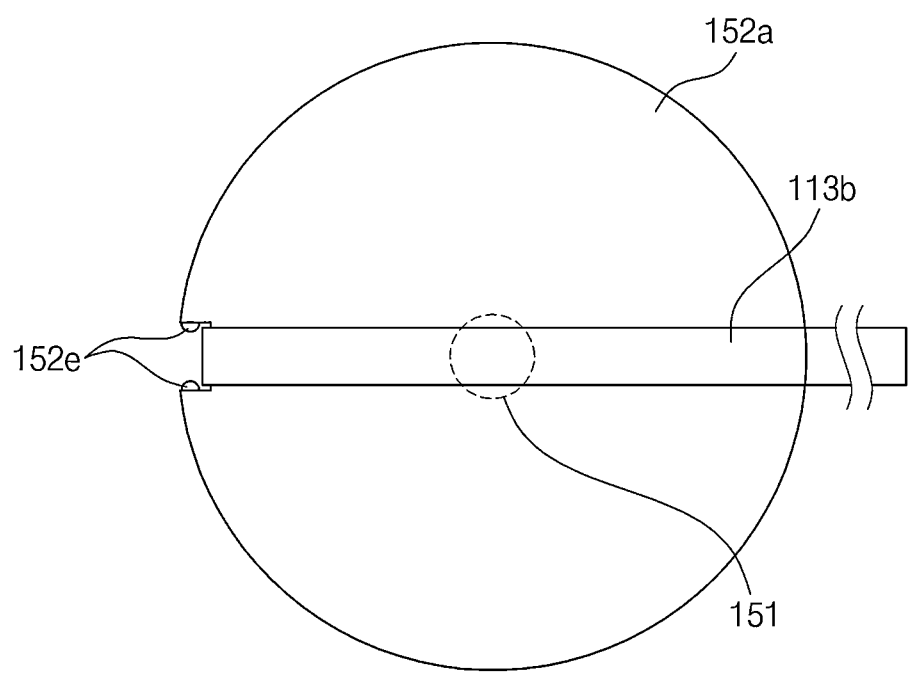
FIG. 4 is a plan view of FIG. 3.

A though-hole 152c into which the connection portion between the first-a coupling surface 113a and the first-b coupling surface 113b of the first electrode tab 113 is inserted is formed in the upper cover surface 152a. Referring to FIG. 2, the through-hole 152c is formed to be opened outwardly of the upper cover surface 152a. In addition, a depth of the through-hole 152c is formed to be greater than a thickness of the first-a coupling surface 113a to prevent the first electrode tab inserted into the through-hole from being connected to the wall surface.

In addition, a support protrusion 152c-1 supporting the first electrode tab inserted into the through-hole 152c so as not to be separated is formed in the through-hole 152c, and the support protrusion 152c-1 is formed on each of both inner surfaces of the through-holes, which correspond to each other.

An edge of the lower cover surface 153a of the lower plate 153 is supported on the wall surface 122 of the lower can 120 so as not to move inside the lower can 120 to prevent noise from being generated by the lower cover surface 153a and prevent a lower end of the electrode assembly, which is provided on the center pin 151, from moving in left and right directions. Particularly, the lower cover surface 153a may reinforce strength of the lower can while being supported on the wall surface of the lower can to greatly prevent the lower can from being deformed.

A though-hole 153c into which the connection portion between the second-a coupling surface 114a and the second-b coupling surface 114b of the second electrode tab 114 is inserted is formed in the lower cover surface 153a. Referring to FIG. 2, the through-hole 153c is formed to be opened outwardly of the lower cover surface 153a. Thus, it is possible to prevent the second electrode tab inserted into the through-hole 153c from being connected to the wall surface.

In addition, a support protrusion 153c-1 supporting the second electrode tab inserted into the through-hole 153c so as not to be separated is formed in the through-hole 153c, and the support protrusion 153c-1 is formed on each of both inner surfaces of the through-holes, which correspond to each other.

An end of the first-b coupling surface 113b extends toward the wall surface 122 of the lower can 120 and then is supported by the gasket 140 disposed between the lower can 120 and the upper can 130. That is, the first-b coupling surface 113b may be disposed between the upper cover surface 152a and the upper can to reinforce strength of the upper can and prevent the upper can from being deformed from the external impact.

The first-b coupling surface 113b may be in close contact with the upper cover surface and be attached to the upper cover surface by an adhesive layer.

An end of the second-b coupling surface 114b extends toward the wall surface 122 of the lower can 120 and then is supported on the inner wall of the lower can 120. That is, the second-b coupling surface 114b may be disposed between the lower cover surface 153a and the lower can 120 to reinforce the strength of the lower can and prevent the lower can from being deformed from the external impact.

The center part 150 may be made of an insulating material. For example, the center part may be made of any one of polyphenylsulfone (PPSU), polyethersulfone (PES), and polysulfone (PSU). Thus, the center part 150 may stably insulate the electrode assembly 110 and the upper can 130 or the electrode assembly 110 and the lower can 120 from each other, and as a result, since a separate insulator is not required, costs may be reduced, and the structure may be simplified.

Therefore, the button-type secondary battery 100 according to the first embodiment of the present invention may comprise the center part provided with the center pin and the upper a lower plates to prevent the electrode assembly from being deformed and stably protect the electrode assembly from the external impact.

Hereinafter, in descriptions of another embodiment of the present invention, constituents having the same function and shape as the above-mentioned embodiment have been given the same reference numeral in the drawings, and thus duplicated description will be omitted.

[Button-Type Secondary Battery According to Second Embodiment of the Present Invention]

Figure 5:
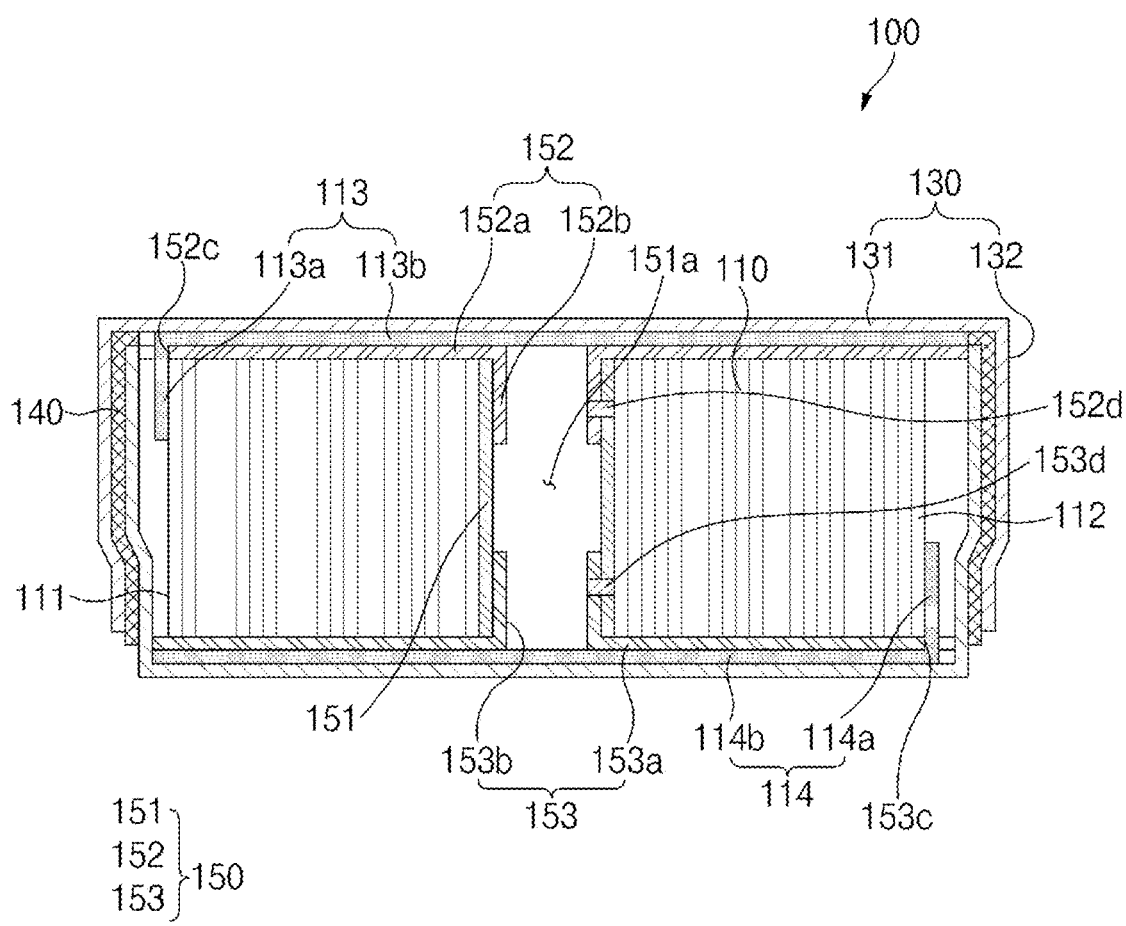
FIG. 5 is a cross-sectional view of a button-type secondary battery according to a second embodiment of the present invention.
Figure 6:
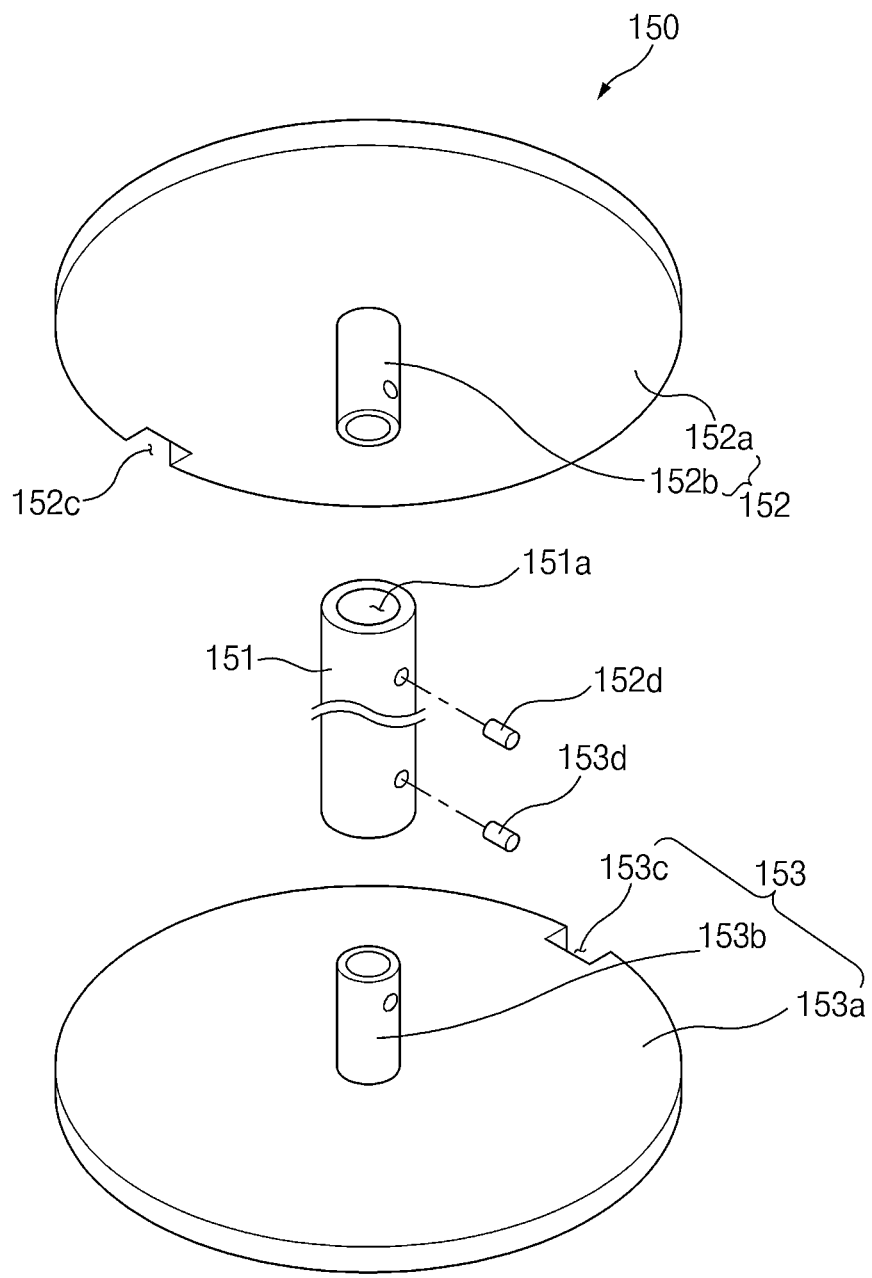
FIG. 6 is a perspective view illustrating a center part of the button-type secondary battery according to the second embodiment of the present invention.

As illustrated in FIGS. 5 and 6, a secondary battery 100 according to a second embodiment of the present invention comprises an electrode assembly 110, a lower can 120, an upper can 130, a gasket 140, and a center part 150.

Here, the electrode assembly, the lower can, the upper can, and the gasket have the same configuration as the electrode assembly, the lower can, the upper can, and the gasket, which are described in the first embodiment, and thus duplicated descriptions will be omitted.

The center part 150 comprises a center pin 151 inserted into a core portion of the electrode assembly 110, an upper plate 152 disposed above the electrode assembly 110, and a lower plate 153 disposed below the electrode assembly 110.

Here, the center pin 151, the upper plate 152, and the lower plate 153 may be provided to be separated from each other. In more detail, each of the upper plate 152 and the lower plate 153 has a structure that is detachably coupled to the center pin 151. That is, referring to FIG. 5, the upper plate 152 is detachably coupled to an upper portion of the center pin 151, and referring to FIG. 5, the lower plate 153 is detachably coupled to a lower portion of the center pin 151. Thus, the center part 150 may be improved in ease of maintenance, manufacturability, mobility, and storage.

For example, the upper plate 152 comprises an upper cover surface 152a disposed on the upper portion of the center pin 151 and an upper coupling surface 152b detachably coupled to a hollow 151a of the center pin 151. That is, the upper plate 152 may connect the upper cover surface 152a to the center pin 151 when the upper coupling surface 152b is coupled to the hollow 151a of the center pin 151. On the other hand, when the upper coupling surface 152b is separated from the hollow 151a of the center pin 151, the upper cover surface 152a and the center pin 151 may be separated from each other.

Figure 7:
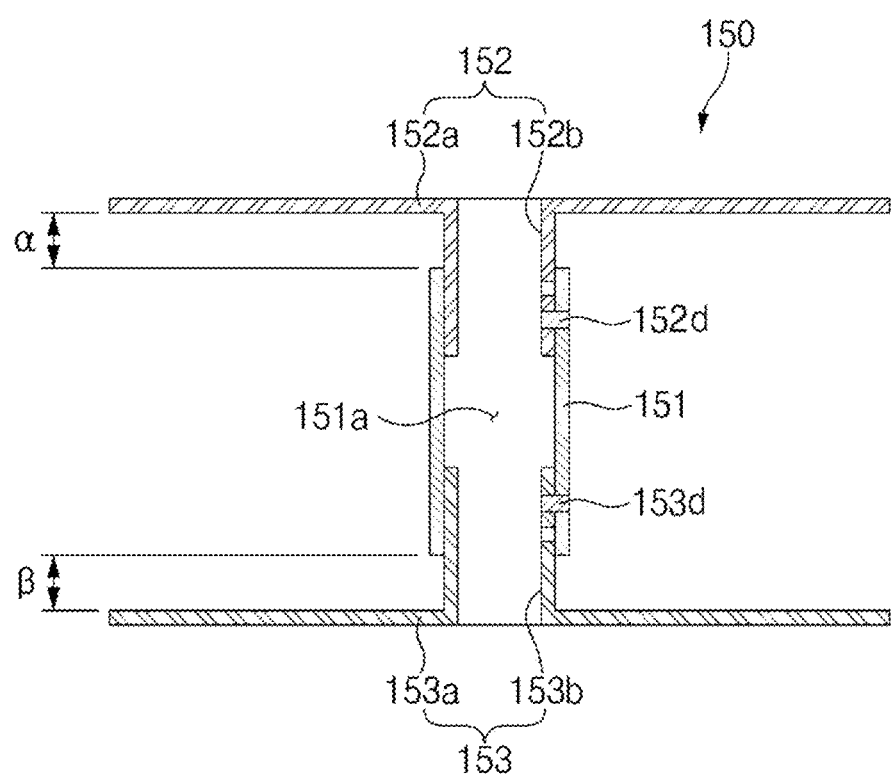
FIG. 7 is a cross-sectional view illustrating a state in which the center part of the button-type secondary battery is adjusted in length according to the second embodiment of the present invention.

Particularly, if a depth of the upper coupling surface 152b coupled to the hollow 151a of the center pin 151 is adjusted, a height of the upper cover surface 152a disposed on an upper end of the center pin 151 may be adjusted. That is, the height of the upper cover surface 152a coupled to the center pin 151 may be adjusted to match a height of a core portion of the electrode assembly, and as a result, it may be used interchangeably with the electrode assembly 110 having various heights. That is, as illustrated in FIG. 7, if the depth of the upper coupling surface 152b coupled to the center pin 151 is reduced by a length α, the height of the upper cover surface may increase by the length α.

The upper plate 152 further comprises an upper fixing part 152d fixing the upper coupling surface 152b coupled to the center pin 151. That is, the upper fixing part 152d is provided as a fixing pin that passes through the center pin 151 to fix the center pin 151 and the upper coupling surface 152b while being pressed or coupled to the upper coupling surface 152b. Thus, it is possible to prevent the center pin and the upper plate from being separated from each other.

In addition, the lower plate 153 comprises a lower cover surface 153a disposed on the lower portion of the center pin 151 and a lower coupling surface 153b detachably coupled to the hollow 151a of the center pin 151. That is, the lower plate 153 may connect the lower cover surface 153a to the center pin 151 when the lower coupling surface 13b is coupled to the hollow 151a of the center pin 151. On the other hand, when the lower coupling surface 13b is separated from the hollow 151a of the center pin 151, the lower cover surface 153a and the center pin 151 may be separated from each other.

Particularly, if a depth of the lower coupling surface 153b coupled to the hollow 151a of the center pin 151 is adjusted, a height of the lower cover surface 153a disposed on a lower end of the center pin 151 may be adjusted. That is, the height of the lower cover surface 153a coupled to the center pin may be adjusted to match the height of the core of the electrode assembly. As a result, it may be used interchangeably with the electrode assembly 110 having various heights. That is, as illustrated in FIG. 7, if the depth of the lower coupling surface 153b coupled to the center pin 151 is reduced by a length β, the height of the lower cover surface 153a may increase by the length β.

The lower plate 153 further comprises a lower fixing part 153d fixing the lower coupling surface 153b coupled to the center pin 151. That is, the lower fixing part 153d may be provided as a fixing pin that passes through the center pin 151 to fix the center pin and the lower coupling surface while being coupled to the lower coupling surface 153b. Thus, it is possible to prevent the center pin and the lower plate from being separated from each other.

The fixing pins 152d and 153d may be coupled to the center pin 151 and the upper coupling surface 152b or the center pin 151 and the lower coupling surface 153b by a screw coupling manner to improve coupling properties.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Button-type secondary battery
110: Electrode assembly
111: First electrode
112: Second electrode
113: First electrode tab
113a: First-a coupling surface
113b: First-b coupling surface
114: Second electrode tab
114a: Second-a coupling surface
114b: Second-b coupling surface
120: Lower can
121: Bottom surface
122: Wall surface
130: Upper can
131: Cover surface
132: Coupling surface
140: Gasket
150: Center part
151: Center pin
151a: Hollow
152: Upper plate
152a: Upper cover surface
152b: Upper coupling surface
152c: Through-hole
152c-1: Support protrusion
152d: Upper fixing part
153: Lower plate
153a: Lower cover surface
153b: Lower coupling surface
153c: Through-hole
153d: Lower fixing part

The invention claimed is:

1. A button-type secondary battery comprising:
an electrode assembly;
a lower can configured to accommodate the electrode assembly therein;
an upper can coupled to an opening of the lower can;
a gasket configured to insulate a coupling portion between the lower can and the upper can; and
a center part at a core portion of the electrode assembly, wherein the center part comprises:
    a center pin inserted into the core portion of the electrode assembly; and
    an upper plate with an upper cover surface provided on an upper end of the center pin to protect an upper portion of the electrode assembly,
wherein an edge of the upper cover surface is supported on an inner wall of the lower can.

2. The button-type secondary battery of claim 1, wherein the center pin has a hollow that is opened vertically, and
wherein the upper plate further comprises an upper coupling surface connecting the upper cover surface to the center pin while being coupled to the hollow of the center pin.

3. The button-type secondary battery of claim 2, wherein the upper plate further comprises an upper fixing part configured to fix the upper coupling surface coupled to the center pin.

4. The button-type secondary battery of claim 3, wherein the upper fixing part includes a fixing pin that passes through the center pin to fix the center pin and the upper coupling surface while being coupled to the upper coupling surface.

5. The button-type secondary battery of claim 1, further comprising a first electrode tab connecting a first electrode disposed on an outer circumferential surface of the electrode assembly to the upper can,
wherein the first electrode tab comprises:
a first-a coupling surface connected to the first electrode; and
a first-b coupling surface connected to the upper can,
wherein a through-hole, into which a connection portion between the first-a coupling surface and the first-b coupling surface is inserted, is defined in the upper cover surface.

6. The button-type secondary battery of claim 5, wherein an end of the first-b coupling surface extends toward the inner wall of the lower can and is supported on the gasket disposed between the lower can and the upper can.

7. The button-type secondary battery of claim 1, wherein the center part comprises a lower plate with a lower cover surface on a lower end of the center pin to protect a lower portion of the electrode assembly, and
wherein an edge of the lower cover surface is supported on the inner wall of the lower can.

8. The button-type secondary battery of claim 7, wherein the center pin has a hollow that is opened vertically, and wherein the lower plate further comprises a lower coupling surface configured to connect the lower cover surface to the center pin while being coupled to the hollow of the center pin.

9. The button-type secondary battery of claim 8, wherein the lower plate further comprises a lower fixing part configured to fix the lower coupling surface coupled to the center pin.

10. The button-type secondary battery of claim 9, wherein the lower fixing part includes a fixing pin that passes through the center pin to fix the center pin and the lower coupling surface while being coupled to the lower coupling surface.

11. The button-type secondary battery of claim 7, further comprising a second electrode tab connecting a second electrode disposed on an outer circumferential surface of the electrode assembly to the lower can,
wherein the second electrode tab comprises:
a second-a coupling surface connected to the second electrode; and
a second-b coupling surface connected to the lower can,
wherein a through-hole, into which a connection portion between the second-a coupling surface and the second-b coupling surface is inserted, is defined in the lower cover surface.

12. The button-type secondary battery of claim 11, wherein an end of the second-b coupling surface extends toward the inner wall of the lower can and is supported on the inner wall of the lower can.

13. The button-type secondary battery of claim 1, wherein the center part includes an insulating material.

* * * * *